US011968264B2

(12) United States Patent
Sathianarayanan et al.

(10) Patent No.: US 11,968,264 B2
(45) Date of Patent: Apr. 23, 2024

(54) SYSTEMS AND METHODS FOR OPERATION MANAGEMENT AND MONITORING OF BOTS

(71) Applicant: ProKarma Inc., Omaha, NE (US)

(72) Inventors: Ramanathan Sathianarayanan, Dublin, CA (US); Krishna Bharath Kashyap, Hyderabad (IN)

(73) Assignee: CONCENTRIX CVG CUSTOMER MANAGEMENT GROUP INC., Cincinnati, OH (US)

( * ) Notice: Subject to any disclaimer, the term of this patent is extended or adjusted under 35 U.S.C. 154(b) by 0 days.

(21) Appl. No.: 17/714,120

(22) Filed: Apr. 5, 2022

(65) Prior Publication Data

US 2022/0232080 A1    Jul. 21, 2022

Related U.S. Application Data

(63) Continuation of application No. 16/926,587, filed on Jul. 10, 2020, now Pat. No. 11,297,144, which is a
(Continued)

(51) Int. Cl.
*G06F 15/16*     (2006.01)
*G06F 17/18*     (2006.01)
(Continued)

(52) U.S. Cl.
CPC ............ *H04L 67/125* (2013.01); *G06F 17/18* (2013.01); *G06Q 10/103* (2013.01)

(58) Field of Classification Search
CPC ...... H04L 67/125; G06F 17/18; G06Q 10/103
(Continued)

(56) References Cited

U.S. PATENT DOCUMENTS 6,670,973 B1    12/2003    Hill et al.
7,047,291 B2    5/2006    Breese et al.
(Continued)

OTHER PUBLICATIONS

Sathianarayanan et al., U.S. Appl. No. 16/583,118, Notice of Allowance, dated Jun. 10, 2020, 7 pgs.
(Continued)

*Primary Examiner* — Imad Hussain
(74) *Attorney, Agent, or Firm* — Dority & Manning, P.A.

(57) ABSTRACT

A framework and a method are provided for monitoring and managing software bots that collectively automate business processes. The method includes interfacing with the bots executing on a bot infrastructure. The method also includes obtaining the bot-specific performance data and the infrastructure-level performance data recorded by the bots and the bot infrastructure. The method further includes generating or modifying a bot dependency chain based on the bot-specific performance data and the infrastructure-level performance data. The bot dependency chain represents at least one of dependencies amongst the bots and dependencies amongst the related business processes. The method also includes generating an outcome for the business processes according to the bot dependency chain and the bot-specific performance data and the infrastructure-level performance data recorded by the bots and the bot infrastructure.

21 Claims, 9 Drawing Sheets

Related U.S. Application Data continuation of application No. 16/583,118, filed on Sep. 25, 2019, now Pat. No. 10,735,522.

(60) Provisional application No. 62/886,842, filed on Aug. 14, 2019.

(51) Int. Cl.
*G06Q 10/10* (2023.01)
*H04L 67/125* (2022.01)

(58) Field of Classification Search
USPC .......................................................... 709/224
See application file for complete search history.

(56) References Cited

U.S. PATENT DOCUMENTS

| | | | |
|---|---|---|---|
| 7,197,561 B1 | 3/2007 | Lovy et al. | |
| 7,243,306 B1 | 7/2007 | Joshi et al. | |
| 7,836,156 B1 | 11/2010 | Ou et al. | |
| 7,912,749 B2 | 3/2011 | Wong et al. | |
| 8,990,388 B2 | 3/2015 | Ebrahim et al. | |
| 10,735,522 B1 | 8/2020 | Sathianarayanan et al. | |
| 2004/0024627 A1 | 2/2004 | Keener | |
| 2005/0251432 A1 | 11/2005 | Barker et al. | |
| 2006/0064486 A1 | 3/2006 | Baron et al. | |
| 2008/0040364 A1 | 2/2008 | Li | |
| 2008/0222287 A1* | 9/2008 | Bahl | H04L 41/5058 709/224 |
| 2009/0006527 A1 | 1/2009 | Gingell, Jr. et al. | |
| 2010/0153156 A1 | 6/2010 | Guinta et al. | |
| 2012/0215912 A1 | 8/2012 | Houlihan et al. | |
| 2012/0216081 A1 | 8/2012 | Duvvoori et al. | |
| 2013/0097183 A1 | 4/2013 | McCracken | |
| 2013/0304530 A1 | 11/2013 | Chodavarapu et al. | |
| 2015/0254330 A1 | 9/2015 | Chan et al. | |
| 2017/0060108 A1* | 3/2017 | Kakhandiki | G06N 5/01 |
| 2017/0075749 A1 | 3/2017 | Ambichl et al. | |
| 2018/0032216 A1* | 2/2018 | Naous | G06F 11/323 |
| 2018/0121335 A1 | 5/2018 | Cillis et al. | |
| 2019/0066018 A1* | 2/2019 | Sethi | G06Q 10/0633 |
| 2019/0095470 A1 | 3/2019 | Dundjerski et al. | |
| 2019/0327154 A1 | 10/2019 | Sahoo et al. | |
| 2019/0378073 A1 | 12/2019 | Lopez et al. | |
| 2022/0258334 A1* | 8/2022 | Krishnamoorthy | G05B 13/0265 |
| 2022/0327006 A1* | 10/2022 | Makhija | G06N 20/00 |
| 2023/0039566 A1* | 2/2023 | Ghag | G06F 11/0736 |

OTHER PUBLICATIONS

Sathianarayanan et al., U.S. Appl. No. 16/583,118, Non-Final Office Action, dated Dec. 30, 2019, 16 pgs.

Sathianarayanan et al., U.S. Appl. No. 16/926,587, Notice of Allowance, dated Nov. 26, 2021, 8 pgs.

Sathianarayanan et al., U.S. Appl. No. 16/926,587, Non-Final Office Action, dated Jul. 22, 2021, 23 pgs.

Sathianarayanan et al., U.S. Appl. No. 17/714,120, Non-Final Office Action, dated May 10, 2023, 26 pgs.

Wetzstein et al., "Monitoring and Analyzing Influential Factors of Business Process Performance", 2009 IEEE International Enterprise Distributed Object Computing Conference, 10 pgs.

* cited by examiner

422 — Detect an outage of the plurality of bots based on the bot-specific performance data, the respective bot dependency chain, a rules-based asset and cross asset status evaluation of data corresponding to the plurality of related business processes, and patterns-based temporal correlation of data corresponding to the plurality of related business processes 424 — Simulate execution of the plurality of bots on the first bot infrastructure by playing back operations of the plurality of bots based on the bot-specific performance data and the infrastructure-level performance data the simulation indicating a cause of the outage of the plurality of bots

Figure 4E

426 — Apply one or more statistical threshold analyses, using one or more predetermined thresholds, on the bot-specific performance data and the infrastructure-level performance data to determine a positive or a negative outcome for the plurality of related business processes

Figure 4F

428 — Generate and provide a dashboard that indicates status of the plurality of bots and one or more business assets corresponding to the plurality of bots

Figure 4G

430 — Evaluate the bot-specific performance data to determine return on investment (ROI) due to the plurality of related business processes

Figure 4H

432 — Generate and display a dependency tree that encapsulates dependencies amongst the plurality of related business processes

Figure 4I

434 — Generate and report long term trends calculated using one or more analytics frameworks based on the bot-specific performance data and the infrastructure-level performance data

Figure 4J

SYSTEMS AND METHODS FOR OPERATION MANAGEMENT AND MONITORING OF BOTS

RELATED APPLICATIONS

This application is a continuation application of U.S. patent application Ser. No. 16/926,587, filed Jul. 10, 2020, which is a continuation of U.S. patent application Ser. No. 16/583,118, filed Sep. 25, 2019, now U.S. Pat. No. 10,735,522, which claims the benefit of U.S. Provisional Application No. 62/886,842, filed Aug. 14, 2019, all of which are incorporated herein in their entireties.

TECHNICAL FIELD

The present disclosure relates generally to testing frameworks, and more specifically, to systems and methods that enable operation management and monitoring of software bots that automate business processes.

BACKGROUND

Robotic Process Automation (RPA) includes technologies used to automate repetitive human activity in business processes. RPA enables businesses to accomplish tasks more efficiently and accurately. RPA has evolved beyond its early form in screen scraping, and includes complex techniques for processing and entering data into an interface meant to be used by a human. The advent of virtualization technology has led to scalable RPA deployments. However, such systems have also complicated maintenance of conventional software. For example, software bots that implement business processes create unexpected issues with graphical user interfaces used in business environments. Moreover, large-scale operation of RPA requires that the operation of hundreds, if not thousands, of such bots are continuously monitored, and that appropriate actions are taken, sometimes in real-time.

SUMMARY

In addition to the problems set forth in the background section, there are other reasons where an improved system and method of performing operation and monitoring of software bots are needed. For example, some existing tools and products for managing the operation of RPA bots fail to provide the right granularity of information and control for business users. Bot failures are not traced to business process failures, or vice-versa. Moreover, such tools also lack one or more features required for the proper monitoring of software bots. For instance, the products do not have the capabilities for agent-based and/or centralized logging, business asset status evaluation, failure detection, root-cause analysis, long-term trending analytics, and/or real-time visualization. Furthermore, the plethora of tools have also led to a divergence in the technologies and there exists a great need for a standard for inter-operation of such tools.

The present disclosure describes a system and method that addresses at least some of the shortcomings of conventional methods and systems for operation and management of software bots identified above.

In accordance with some embodiments, a method is provided for monitoring and managing software bots that collectively automate business processes. The method includes interfacing with a plurality of bots executing on a first bot infrastructure. Each bot of the plurality of bots automates one or more business processes of a plurality of related business processes. Each bot includes first instrumented instructions that record bot-specific performance data corresponding to the plurality of related business processes automated on the first bot infrastructure by said each bot. The first bot infrastructure includes second instrumented instructions that record infrastructure-level performance data during execution of the plurality of bots. The method further includes obtaining the bot-specific performance data and the infrastructure-level performance data recorded by the plurality of bots and the first bot infrastructure. The method also includes generating or modifying a respective bot dependency chain based on the bot-specific performance data and the infrastructure-level performance data recorded by the plurality of bots and the first bot infrastructure. The respective bot dependency chain represents at least one of dependencies amongst the plurality of bots and dependencies amongst the plurality of related business processes. The method further includes generating an outcome for the plurality of related business processes according to the respective bot dependency chain and the bot-specific performance data and the infrastructure-level performance data recorded by the plurality of bots and the first bot infrastructure.

In some embodiments, generating the outcome for the plurality of related business processes includes performing temporal correlation of data corresponding to the plurality of related business processes. In some embodiments, the method further includes obtaining metadata corresponding to the plurality of bots and using the metadata in performing the temporal correlation.

In some embodiments, generating the outcome for the plurality of related business processes includes detecting a failure of the plurality of bots and performing root cause analysis (RCA) of the failure based on the bot-specific performance data.

In some embodiments, generating the outcome for the plurality of related business processes includes obtaining a set of rules corresponding to one or more business assets corresponding to the plurality of bots, and evaluating status of the one or more business assets based on data corresponding to the plurality of related business processes and the set of rules.

In some embodiments, generating the outcome for the plurality of related business processes includes detecting an outage of the plurality of bots based on the bot-specific performance data, the respective bot dependency chain, a rules-based asset and cross asset status evaluation of data corresponding to the plurality of related business processes, and patterns-based temporal correlation of data corresponding to the plurality of related business processes. In some embodiments, generating the outcome for the plurality of related business processes includes simulating execution of the plurality of bots on the first bot infrastructure by playing back operations of the plurality of bots based on the bot-specific performance data and the infrastructure-level performance data the simulation indicating a cause of the outage of the plurality of bots.

In some embodiments, generating the outcome for the plurality of related business processes includes applying one or more statistical threshold analyses, using one or more predetermined thresholds, on the bot-specific performance data and the infrastructure-level performance data to determine a positive or a negative outcome for the plurality of related business processes.

In some embodiments, generating the outcome for the plurality of related business processes includes generating and reporting long term trends (e.g., over a period of hours, days) calculated using one or more analytics frameworks based on the bot-specific performance data and the infrastructure-level performance data.

In some embodiments, generating the outcome for the plurality of related business processes comprises generating and providing a dashboard that indicates status of the plurality of bots and one or more business assets corresponding to the plurality of bots.

In some embodiments, generating the outcome for the plurality of related business processes includes evaluating the bot-specific performance data to determine return on investment (ROI) due to the plurality of related business processes.

In some embodiments, generating the outcome for the plurality of related business processes includes generating and displaying a dependency tree that encapsulates dependencies amongst the plurality of related business processes.

In some embodiments, the method further includes monitoring subscription information for the plurality of bots and generating a report if the subscription information according to the subscription information.

In some embodiments, the method further includes obtaining one or more criteria from a user and using the criteria to generate the outcome for the plurality of related business processes.

In some embodiments, the method further includes providing a user interface and generating and displaying, in the user interface, a bot dependency view that represents dependencies amongst the plurality of bots, a process view displaying the plurality of related business processes, a machine view displaying a mapping between the plurality of bots and the first bot infrastructure, and an error view displaying recent errors and correlation information.

In some embodiments, the method further includes collecting and aggregating data from one or more processes monitoring at least one of the plurality of bots, the first bot infrastructure, one or more applications executing on the first bot infrastructure, and using the aggregate data in determining and generating the outcome for the plurality of related business processes.

In accordance with some implementations, an electronic device has one or more processors and memory storing one or more programs executable by the one or more processors. The one or more programs include instructions for performing any of the methods described herein.

In accordance with some implementations, a non-transitory computer-readable storage medium has one or more processors and memory storing one or more programs executable by the one or more processors. The one or more programs include instructions for performing any of the methods described herein.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures and specification.

DESCRIPTION OF EMBODIMENTS

Figure 1:
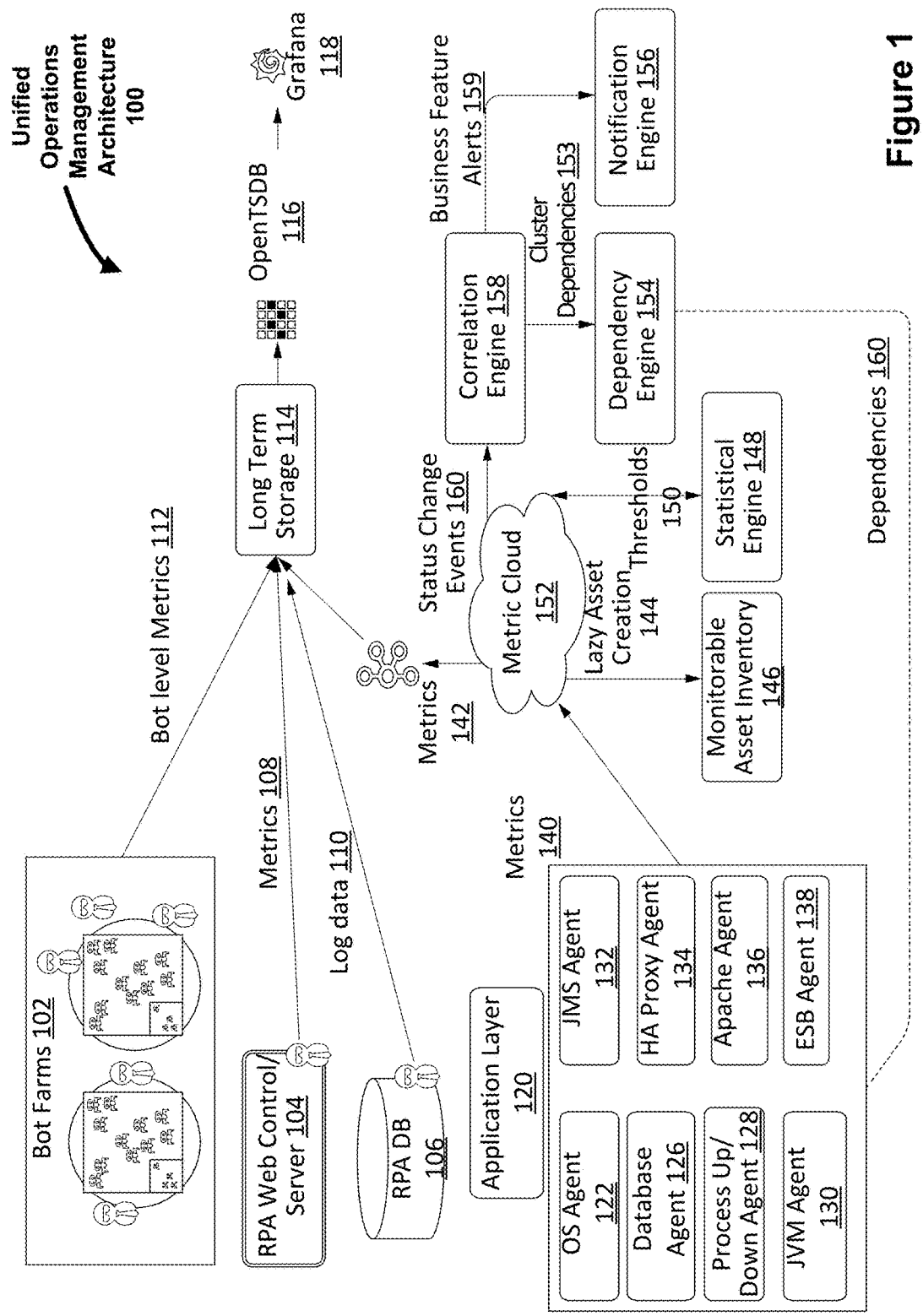
FIG. 1 is an architectural block diagram of a unified operations management platform in accordance with some embodiments.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the term "if" means "when" or "upon" or "in response to determining" or "in response to detecting" or "in accordance with a determination that," depending on the context. Similarly, the phrase "if it is determined" or "if [a stated condition or event] is detected" means "upon determining" or "in response to determining" or "upon detecting [the stated condition or event]" or "in response to detecting [the stated condition or event]" or "in accordance with a determination that [a stated condition or event] is detected," depending on the context.

It will also be understood that, although the terms first, second, etc. are, in some instances, used herein to describe various elements, these elements should not be limited by these terms. These terms are used only to distinguish one element from another.

As described above, there is a need for technologies that unify the operation and management of bots that collectively automate hundreds or even thousands of business processes. The systems and methods disclosed herein detect bot failures, trace business transactions, and generate visualizations, thereby providing observability of RPA processes. The techniques include instrumenting bots and/or bot infrastructure to generate logs or performance data, using the generated information to build a dependency map that captures the dependencies amongst the bots (sometimes called cross-component telemetry), and using the map to derive or generate outcomes, including generating visualizations, about the bots and/or business processes. Such techniques can be used as a foundation for providing Business Process as a Service (BPAAS). In various embodiments, the systems and methods provide monitoring, business transaction tracing, metrics reporting (e.g., reporting key business process outcomes), failure or dependency tracking, and visualization of business processes, thereby reducing overall cost of digital operations and providing scalability, higher predictability, and observability.

FIG. 1 is an architectural block diagram of a unified operations management platform 100 in accordance with some embodiments. As illustrated, the framework 100 includes bot farms (groups of software bots) that collectively automate one or more business processes. The bot farms 102 generate bot-level metrics (sometimes called bot-specific performance data). The framework 100 also includes UI applications 104 (e.g., a robotic process automation (RPA) web control server) that is used to manage (e.g., interface with and/or control) bot ecosystems (e.g., the bot farms 102). In some embodiments, the server 104 is a bot infrastructure that is used to execute each bot in the bot farms 102. The server 104 generates metrics 108 (sometimes called infrastructure-level performance data). In some embodiments, the bot infrastructure or server 104 is instrumented through a third party agent that provides logs or metric data to the framework 100. The framework 100 also includes a RPA database (RPA DB) 106 (e.g., a SQL database server) that is used to store data related to the RPA (e.g., data on the bot to business process mapping, number of bots, business processes). In some embodiments, the RPA DB 106 supplies log data 110 based on stored data.

In some embodiments, the framework 100 includes an application layer 120 that generates metrics 140. In some embodiments, the metrics 140 is stored in a metric cloud 152, a cloud storage infrastructure. In some embodiments, the application layer 120 includes an OS agent 122 (e.g., a Linux agent used to monitor Linux or OS processes). For example, vmstat, iostat, or similar system commands (supported by a Linux kernel) are used to provide operating system-level data. On Windows, some embodiments use perfmon windows native commands to generate performance data. Some embodiments use third-party software to generate performance data. In some embodiments, the application layer 120 includes database agent 126 (e.g., an Oracle agent used to monitor Oracle or database processes), a process up/down agent 128 (e.g., used to monitor state of processes), a Java Virtual Machine (JVM) agent 130 (e.g., used to monitor JVM processes), a Java Messaging Services (JVM) agent 132 (e.g., used to support messaging or communication between computers in the framework 100), a proxy agent 134 (e.g., HA proxy or a similar reliable, high performance TCP/HTTP load balancing system), an Apache agent 136 (e.g., used to monitor web services), and/or an enterprise service bus (ESB) agent 138 (or a similar system for orchestrating communication between software applications in service-oriented architectures). It is noted that the examples of the various software systems are only used to illustrate the different functionalities present in the application layer 120. In some embodiments, the various functionalities may be implemented using a plurality of software systems.

As illustrated in FIG. 1, the bot-level metrics 112, the metrics 108, the log data 110, and/or metrics 142 from the metric cloud 152 are stored in a long-term storage 114. In some embodiments, the long-term storage 114 is monitored by a system 116, such as a time-series database system (e.g., OpenTSDB, a scalable distributed time-series database) that is used to perform time-series analyses on the data stored in the long-term storage 114. In some embodiments, an analytics platform 118 (e.g., Grafana) is used to query, visualize, generate alerts, and/or analyze metrics. In some embodiments, the analytics platform 118 is used to create, explore, and/or share dashboards.

In some embodiments, the metrics cloud 152 is used to supply status change events 160 (e.g., a change in status of bots in the bot farms 102 or a change in the application layer 120) to a correlation engine 158 that is used to correlate information across status change events 160. The correlation engine 158 generates cluster dependencies 153 which is used by a dependency engine 154 to compute dependencies 160 (e.g., dependency data from agents used to fetch information for tracing failures). In some embodiments, the correlation engine 158 also generates business feature alerts 159 which is transmitted to a notification engine 156 for producing customizable notifications to users of the framework 100. In some embodiments, the correlation engine 158 establishes correlation between business metrics and bot metrics, and/or establishes correlation between bot metrics and infrastructure metrics (e.g., by a determination and/or comparison of time and process names). In some embodiments, the metrics data stored in the metric cloud 152 is used to create business asset related information (e.g., using a lazy or delayed computation), modify existing business asset related data, and/or update a business asset inventory 146 which can be monitored according to business needs. In some embodiments, the metric cloud 152 is used to generate and/or update thresholds for the framework 100, and/or generate statistics using a statistical engine 148. Thus, in various, embodiments, the framework 100 supports the unified operation and management of bots and/or applications.

Figure 2A:
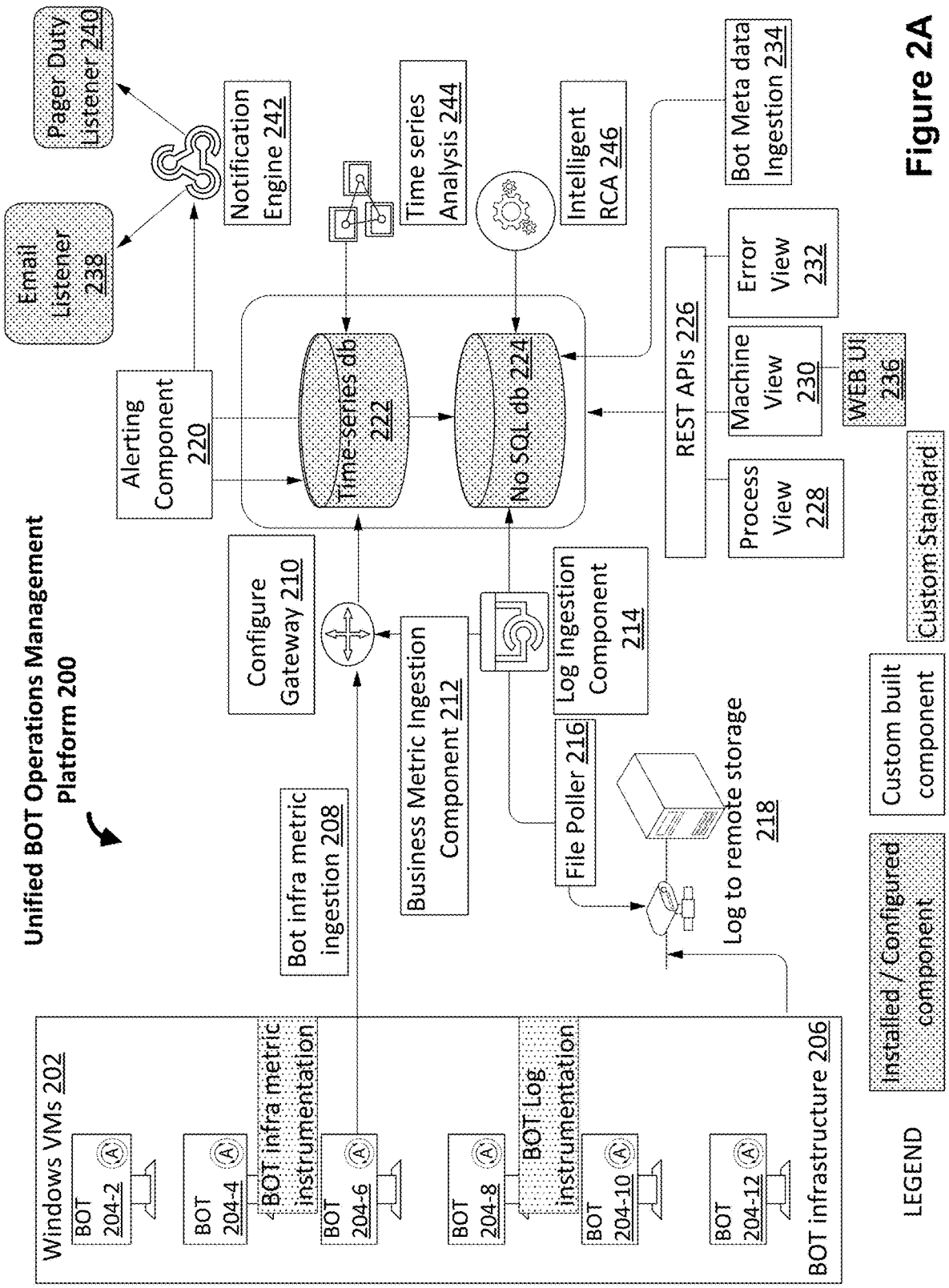
FIG. 2A is an architectural block diagram of a unified bot operations management platform in accordance with some embodiments.

FIG. 2A is an architectural block diagram of a unified bot operations management platform 200 in accordance with some embodiments. As illustrated, the platform 200 includes a bot infrastructure 206. The infrastructure 206 is used to execute a plurality of bots (e.g., bot 204-2, bot 204-4, bot 204-6, bot 204-8, bot 204-10, and bot 204-12) which collectively automate one or more business processes. The infrastructure 206 includes hardware as well as software infrastructure necessary to the software bots 204. In some embodiments, each bot is associated with corresponding one or more business assets. In some embodiments, some bots do not have any physical asset associated, or the associated business assets include intangible assets, such as customer satisfaction metrics. In some embodiments, the bots are executed in a virtual machine (VM) environment (e.g., a Windows VM) so as to partition the resources of the bot computing infrastructure 206 amongst the bots 204.

The bots 204 are instrumented to generate logs (sometimes called bot performance data) during execution. In some embodiments, the generated logs are based on a standard that allows deployment across industries and/or sectors. In some embodiments, the bots 204 and/or the bot infrastructure 206 log performance data that include errors, informational messages, and/or warnings. In some embodiments, the bot-level performance data include raw event data. In some embodiments, the bot-level performance data include processed that, including at least (i) one or more bot metrics (e.g., data on bot health) corresponding to operation of the plurality of bots and (ii) one or more business metrics corresponding to the related business processes. In some embodiments, the bot infrastructure 206 is also instrumented to generate bot infrastructure metrics (sometimes called infrastructure-level performance data). In some embodiments, the infrastructure-level performance data include raw performance data and infrastructure metrics (e.g., hardware performance logs). In some embodiments, the bot-level performance data and/or the infrastructure-level performance data re generated at predetermined time intervals (e.g., every few second, every few hours, etc.). In some embodiments, the bots 204 and/or the infrastructure 206 implement event management (sometimes called security event management) based logging. Some embodiments use one or more agents to monitor the bot infrastructure 206 and/or the bots 204. The platform 200 includes a bot infrastructure metric ingestion component 208 to process bot infrastructure metrics, a business metric ingestion component 212 to process business data (e.g., high-level business process-related information), a log ingestion component 214 to process bot log (sometimes called bot metrics or bot-level performance data). Some embodiments include a bot metadata ingestion component 234 to process bot metadata. In some embodiments, the ingestion components (components 208, 212, 214, and/or 234) obtain and import data for immediate use or for storing to a database. In some embodiments, the ingestion components obtain data that is streamed in real-time. In some embodiments, the ingestion components obtain data in batches or data that is asynchronously generated by the plurality of bots 204, the bot infrastructure 206, and/or business processes. In some embodiments, data obtained by the ingestion components arrive in various data formats. In some embodiments, the ingestion components include data preparation modules to structure and organize data obtained so that the data can be further processed by analytic processes (e.g., business intelligence software).

In some embodiments, the data generated by the bots 204, the bot infrastructure 206, and/or business processes are stored to a remote storage 218. In some embodiments, a file poller 216 polls for changes to files or directories (generated by the ingestion components described above) and starts a process to store relevant data to the remote storage 218. In some embodiments, data processed by the ingestion components (described above) are stored to one or more databases (e.g., a time-series database 222 and/or a no-SQL database 224). In some embodiments, a configure gateway module 210 configures (or routes) data between the ingestion components and the databases.

In some embodiments, an alerting component 220 generates alerts based on data stored to the time-series database. In some embodiments, an analysis component 244 processes data stored in the databases 224 and performs time-series analyses. FIG. 1, described above, illustrates operations and example applications of time-series databases (e.g., the components 116 or 118), according to some embodiments. In some embodiments, a module 246 performs root-cause analysis (RCA) on the data stored in the databases 222 and/or 224. In some embodiments, a notification engine 242 processes alerts generated by the alerting component 220 and supplies notifications to one or more components (e.g., an e-mail listener 238, a pager duty listener 240). Some embodiments of the framework 200 implement intelligent anomaly detection of failures. In some embodiments, a data model for intelligent anomaly detection is derived based on rules (provided by a user) and/or other metrics evaluated in a time series data store.

In some embodiments, one or more web application programming interfaces (APIs) 226, such as REST APIs, generate a process view 228 (a view in a user interface (UI) of the processes), a machine view 230 (a view in a UI of the machine where bots are deployed or are operating), and/or an error view 232 (for displaying errors and/or displaying correlated data) based on the data stored in the databases.

In some embodiments, the framework 200 uses an application protocol, such as LDAP (Lightweight Directory Access Protocol), for querying and modifying items in the databases (described above). In some embodiments, the databases are organized as directory services databases (e.g., using Active Directory (AD)).

In some embodiments, the framework 200 supports external robotic process automation (RPA) tools/frameworks, such as Automation Anywhere, Blue Prism, or UiPath. For example, output generated by these other vendors are processed by the framework 200 and included in the analysis and generation of reports. In some embodiments, the framework 200 generates outcomes and/or data in a data format that is useful for consumption by other RPA processes, tools, or frameworks.

In some embodiments, as a bot is executing, each business operation that the bot is automating is metered and data is aggregated and automatically analyzed. For example, an expense report is reviewed, number of people re-hired is analyzed, and so on.

As described in the background section, more and more business processes are getting automated through robotic process automation (RPA). Once the bots are deployed in production, a platform is required for monitoring and tracking of a large number of bots. Such platforms need to have a robust logging mechanism and be able to provide insights into bot tasks and sub-tasks. Bots can perform many kinds of business processes involving various applications as illustrated in the following table (Table I).

TABLE I

| Type of Application | Actions/Tasks |
| --- | --- |
| Email Accounts | Open Emails/Read Attachments |
| Excel Sheets | Calculations/Pivots |
| Web/Desktop Applications | Navigation to different pages/downloads |
| PDFs | Merge, split, Read |

Typically, one or more task bots are created to perform these actions. Various logs can be used to monitor such bots, including data on applications being used, a context or a screen in action (or a display presented to a user in a web browser), information on the task bot (sometimes called the bot) that is performing the actions, machine where a bot is executing, an action or event being performed, date and time information, dependent tasks, and/or iteration count of the bots.

Example Structure of Logs

In some embodiments, logs are classified according to events. Some embodiments use several types of event logs. The following example table (Table II) shows five different types of event logs.

TABLE II

| Type of Log | Event_Type | Syntax |
| --- | --- | --- |
| Timeline Log | MainBotStart | <Generic> |
| Timeline Log | MainBotEnd | <Generic> |
| Timeline Log | TaskBotStart | <Generic> |
| Timeline Log | TaskBotEnd | <Generic> |
| Data Log | InfoData | <Generic>, data |
| Data Log | DebugData | <Generic>, data |
| Metric Log | BusinessMetrics | <Generic>, data |
| Error Log | Error Data | <Generic>, data |
| Error Log | SystemError | <Generic>, data |
| Process Log | LoopStart | <Generic>, data, count |

TABLE II-continued

| Type of Log | Event_Type | Syntax |
| --- | --- | --- |
| Process Log | LoopEnd | <Generic>, data |
| Process Log | RecordStart | <Generic>, data, RecordNumber |
| Process Log | RecordEnd | <Generic>, data, RecordNumber |

Each of the log shown in the example above is represented using the format: {<GenericString>,<SpecificString>}, according to some embodiments. In some embodiments, specific string is determined by the "event_type" value. The following examples illustrate logs, in accordance with some embodiments. Suppose the event_type is Timeline Log (see table above), an example code (sometimes called RPA software code) for generating the log is shown below. In the following examples, traceid indicates a parent or a primary bot identifier, and a spanid indicates a sub-bot identifier.

Timeline Log, Event Type: MainBotStart
Example line of Code for Log:

```
{"traceid":"$vTraceID$","spanid":"$vTraceID$","processname":"<<ProcessName>>"
,"bot_name":"$vTaskName$","event_type":"MainBotStart","event_time":"$Date$","c
urrent_context":"<Context/ScreenName>","context_app":"<CurrentAppName>","ma
chinename":"$Machine$","BOTASA":"$System(USERNAME)$"}
```

The above example instrumentation produces logs similar to the examples shown below:

```
{"traceid":"2019625211001ps549462","spanid":"2019625211001ps549462","process
name":"ContractUploadToOlive","bot_name":"CUTO_Main.atmx","event_type":"Ma
inBotStart","event_time":"06/25/2019
02:11:32","current_context":"MainBot","context_app":"FolderSetup","machinename"
:"XD-10ISLA-21024","BOTASA":"ps549462"}
```

For further illustration, here is another example of an instrumentation followed by a sample data log, in accordance with some embodiments.

Data Log, Event Type: InfoData

```
{"traceid":"$vTraceID$","spanid":"$vTraceID$","processname":"<<ProcessName>>"
,"bot_name":"$vTaskName$","event_type":"InfoData","event_time":"$Date$","curre
nt_context":"<Context/ScreenName>","context_app":"<CurrentAppName>","machin
ename":"$Machine$","BOTASA":"$System(USERNAME)$","data":"<loggeddata>"}
```

Sample:

```
{"traceid":"2019625211001ps549462","spanid":"2019625211001ps549462","process
name":"ContractUploadToOlive","bot_name":"CUTO_Main.atmx","event_type":"Inf
oData","event_time":"06/25/2019
02:11:40","current_context":"MainBot","context_app":"MainProcess","machinename
":"XD-10ISLA-21024","BOTASA":ps549462,"data":"BeginMainProcessing"}
```

Similar to the examples above, the following provide further examples as illustrations for the instrumentation followed by sample logs corresponding to the example instrumentations, in accordance with some embodiments.

Data Log, Event Type: DebugData

```
{"traceid":"$vTraceID$","spanid":"$vTraceID$","processname":"<<ProcessName>>"
,"bot_name":"$vTaskName$","event_type":"DebugData","event_time":"$Date$","cur
rent_context":"<Context/ScreenName>","context_app":"<CurrentAppName>","mach
inename":"$Machine$","BOTASA":"$System(USERNAME)$","data":"<loggeddata
>"}
```

Sample:

{"traceid":"2019625211001ps549462","spanid":"004","processname":"ContractUploadToOlive","bot_name":"MasterReports.atmx","event_type":"DebugData","event_time":"06/25/2019 02:12:22","current_context":"IgnoringUnRelatedAttchmnts","context_app":"Salesforce","machinename":"XD-10ISLA-21024","BOTASA":"ps549462","data":"RecNmbr: 1 , DocuSignAttchmntName: Wireless_Service_Agreement_DB-1906-26191_06-12-19_1719.pdf"}

Data Log, Event Type: ErrorData

{"traceid":"$vTraceID$","spanid":"$vTraceID$","processname":"<<ProcessName>>","bot_name":"$vTaskName$","event_type":"ErrorData","event_time":"$Date$","current_context":"<Context/ScreenName>","context_app":"<CurrentAppName>","machinename":"$Machine$","BOTASA":"$System(USERNAME)$","data":"<loggeddata>"}

Sample:

{"traceid":"2019625211001ps549462","spanid":"004","processname":"ContractUploadToOlive","bot_name":"MasterReports.atmx","event_type":"ErrorData","event_time":"06/25/2019 02:12:22","current_context":"IgnoringUnRelatedAttchmnts","context_app":"Salesforce","machinename":"XD-10ISLA-21024","BOTASA":"ps549462","data": "ErrorLine: 1 , ErrorDesc: UnableToLogin to SalesForce"}

Data Log, Event Type: SystemError

{"traceid":"$vTraceID$","spanid":"$vTraceID$","processname":"<<ProcessName>>","bot_name":"$vTaskName$","event_type":"SystemError","event_time":"$Date$","current_context":"<Context/ScreenName>","context_app":"<CurrentAppName>","machinename":"$Machine$","BOTASA":"$System(USERNAME)$","data":"<loggeddata>"}

Sample:

{"traceid":"2019625211001ps549462","spanid":"004","processname":"ContractUploadToOlive","bot_name":"MasterReports.atmx","event_type":"SystemError","event_time":"06/25/2019 02:12:22","current_context":"IgnoringUnRelatedAttchmnts","context_app":"Salesforce","machinename":"XD-10ISLA-21024","BOTASA":"ps549462","data": "ErrorLine: 1 , ErrorDesc: UnableToLogin to SalesForce"}

Data Log, Event Type: BusinessMetric

{"traceid":"$vTraceID$","spanid":"$vTraceID$","processname":"<<ProcessName>>","bot_name":"$vTaskName$","event_type":"BusinessMetric","event_time":"$Date$","current_context":"<Context/ScreenName>","context_app":"<CurrentAppName>","machinename":"$Machine$","BOTASA":"$System(USERNAME)$","data":"<loggeddata>"}

Sample:

{"traceid":"2019625211001ps549462","spanid":"004","processname":"ContractUploadToOlive","bot_name":"MasterReports.atmx","event_type":"BusinessMetric","event_time":"06/25/2019 02:12:22","current_context":"IgnoringUnRelatedAttchmnts","context_app":"Salesforce","machinename":"XD-10ISLA-21024","BOTASA":"ps549462","data": "TotalRequestsProcessed:244"}

Process Log, Event Type: Loop Start

{"traceid":"$vTraceID$","spanid":"$vTraceID$","processname":"<<ProcessName>>",
"bot_name":"$vTaskName$","event_type":"LoopStart","event_time":"$Date$",
"current_context":"<Context/ScreenName>","context_app":"<CurrentAppName>",
"machinename":"$Machine$","BOTASA":"$System(USERNAME)$","data":
"<loggeddata>","count":""}

Sample:

{"traceid":"2019619236001ps549462","spanid":"2019619236001ps549462",
"processname":"ContractUploadToOlive","bot_name":"MergeFiles.atmx","event_type":
"LoopStart","event_time":"06/25/2019 02:12:22","current_context":
"LoopThruAttchmntsToMerge","context_app":"FileOperations","machinename":
"XD-10ISLA-21024","BOTASA":"ps549462","data":
"Activity:ProcessingValidRecords","count":"2"}

Process Log, Event Type: Loop End

{"traceid":"$vTraceID$","spanid":"$vTraceID$","processname":"<<ProcessName>>",
"bot_name":"$vTaskName$","event_type":"RecordEnd","event_time":"$Date$",
"current_context":"<Context/ScreenName>","context_app":"<CurrentAppName>",
"machinename":"$Machine$","BOTASA":"$System(USERNAME)$","data":"<loggeddata>"}

Sample:

{"traceid":"2019619236001ps549462","spanid":"2019619236001ps549462","processname":
"ContractUploadToOlive","bot_name":"MergeFiles.atmx","event_type":"LoopEnd",
"event_time":"06/25/2019 02:12:22","current_context":"LoopThruAttchmntsToMerge",
"context_app":"FileOperations","machinename":"XD-10ISLA-21024","BOTASA":
"ps549462","data":"Activity:ProcessingValidRecords"}

Process Log, Event Type: Record Start

{"traceid":"$vTraceID$","spanid":"$vTraceID$","processname":"<<ProcessName>>",
"bot_name":"$vTaskName$","event_type":"RecordStart","event_time":"$Date$",
"current_context":"<Context/ScreenName>","context_app":"<CurrentAppName>",
"machinename":"$Machine$","BOTASA":"$System(USERNAME)$","data":
"<loggeddata>","record_number":"<recordNmbr>"}

Sample:

{"traceid":"2019619236001ps549462","spanid":"2019619236001ps549462","processname":
"ContractUploadToOlive","bot_name":"MergeFiles.atmx","event_type":"RecordStart",
"event_time":"06/25/2019 02:12:22","current_context":"LoopThruAttchmntsToMerge",
"context_app":"FileOperations","machinename":"XD-10ISLA-21024","BOTASA":
"ps549462","data":"Activity:ProcessingValidRecords","record_number":"2"}

Process Log, Event Type: Record End

{"traceid":"$vTraceID$","spanid":"$vTraceID$","processname":"<<ProcessName>>",
"bot_name":"$vTaskName$","event_type":"RecordEnd","event_time":"$Date$",
"current_context":"<Context/ScreenName>","context_app":"<CurrentAppName>",
"machinename":"$Machine$","BOTASA":"$System(USERNAME)$","data":"<loggeddata>",
"record_number":"<recordNmbr>"}

Sample:

```
{"traceid":"2019619236001ps549462","spanid":"2019619236001ps549462","processname":
"ContractUploadToOlive","bot_name":"MergeFiles.atmx","event_type":"RecordEnd",
"event_time":"06/25/2019 02:12:22","current_context":"LoopThruAttchmntsToMerge",
"context_app":"FileOperations","machinename":"XD-10ISLA-21024","BOTASA":
"ps549462","data":"Activity:ProcessingValidRecords","record_number":"2"}
```

The following table (Table III) provides details about the description of each parameter used in the example logs illustrated above, in accordance with some embodiments.

TABLE III

| Parameter | Description | Sample Value |
| --- | --- | --- |
| traceid | Unique identifier to mark a run | 201904292046001PK134138 |
| spanid | Unique identifier for each sub task | Same as traceid - when logged from main task else a 3 digit number for each subtask |
| processname | Name of the process this bot belongs to | forceclosepo |
| bot_name | Name of the bot in which this log exists | forceclosepo_main |
| event_type | Type of Event | metric, data, error, start, end |
| event_time | Event time in "currentmillisec" | 1556551298000 |
| current_context | Name of the screen/function/window | posearchpage |
| context_app | Name of the application/util | Peoplesoft |
| record_count | Number indicating the current iteration | 1 |
| machinename | Name of the machine where this BOT is running | XDISLA2978.customer.com |
| BOTASA | Name of the user logged into the BOT machine | ps549462 |
| Data | Any data that has to be logged | All data values have to be "Key-value" pairs themselves. |

In some embodiments, in order to determine the business unit or area a log belongs to, traceIDs (in the examples above) include a business unit (BU) identifier. Each BU is represented by a two digit code, for example.

The following table illustrates example codes, according to some embodiments.

| BusinessUnit | Code |
| --- | --- |
| Finance | 01 |
| Sales | 02 |
| HR | 03 |
| Network | 04 |
| Care | 05 |
| B2B | 06 |

In some embodiments, a unique number is generated for traceid each time a bot is run. The following is an example illustrating unique traceid generation, according to some embodiments.

YearMonthDayHourMinute<XXX>BOTUserName.
   XXX being a 3 digit code for process
Create a variable: vTraceID
Assign
$Year$$Month$$Day$$Hour$$Minute$<BusinessUnit>
   $System(USERNAME)$ To vTraceID In some embodiments, an event time (event time parameter in the examples above) is recorded, representing the time at which the event has occurred or a log is written. Some embodiments use a predefined format (e.g., MM/DD/YYYY HH:mm:ss format) for the event time.

Some embodiments record names of bots (bot name parameter in the examples above). Some embodiments use a bot automation task file (e.g., an Automation Anywhere task file, sometimes called an atmx file) where the log is being called from, as illustrated below.

Create variables: vTaskFullPath, vTaskName
Use LIBRARY\ GetBotName.atmx
BOT name is assigned to vTaskName, use the same in logs as bot_name Some embodiments generate logs at predetermined time intervals. For example, for Timeline Logs, some embodiments generate logs at the beginning of each main task ensure a log with "event_type": "MainBotStart". Some embodiments generate logs at the beginning of each sub task (e.g., .atmx calls) to ensure a log with "event_type":"TaskBotStart" is generated. Some embodiments generate a log at the end of each main task ensure a log with "event_type": "MainBotEnd". Some embodiments generate logs at the end of each task or sub task to ensure a log with "event_type": "TaskBotEnd" is generated.

Similarly, for Error Logs, some embodiments use instrumentation in all error handling blocks. For example, when an exception occurs, a log with the format "event_type": "SystemError" is generated. Some embodiments also generate screenshots of the errors and/or respective line numbers, or error codes. In some embodiments, when an error is logged as a logical or business level error, data in the format "event_type": "ErrorData" is inserted with "errordesc" containing a unique identifier of iteration (of the bots) and one or more identifiers indicating the error (e.g., an error line of the bot source code).

To further illustrate, for Data Logs, some embodiments generate "event_type": "InfoData" after every conditional statement. Some embodiments generate an "event_type": "InfoData" log information by including an identifier of a variable that determines the condition. Some embodiments generate "event_type": "InfoData" using a "Key": "Value" format. Some embodiments generate logs with "event_type": "InfoData" for efficient post-processing. In some embodiments, a "data" key—value is used so that further details in the log can be processed. Some embodiments generate "event_type": "DebugData" to log b information that would helpful in troubleshooting critical issues. Some embodiments generate "event_type": "DebugData" logs with information about the variable that determines the condition. Some embodiments generate logs with "event_type": "DebugData". Some embodiments generate a "data" key—value in the log so that further details can be processed. Some embodiments generate "event_type": "DebugData" without personally identifiable information (PII) and in a General Data Protection Regulation (GDPR)-compliant manner. For example, some embodiments use anonymized data, and/or use OrderIDs, ItemIDs, AmountProcessed, AmountSaved.

As further illustration, some embodiments generate Metric Logs using the format "event_type": "BusinessMetric" after every business transaction and/or after the whole process is completed. Some embodiments generate "event_type": "BusinessMetric" after a loop or iteration, thus capturing number of iterations successfully processed by the bots.

Some embodiments generate Process Logs using the format "event_type": "LoopStart" before each loop (of the bot) that actually processes data. In some embodiments, "LoopStart" logs have a key-value pair, "count": "<nmbr>". Some embodiments generate a "count" of the number of iterations of a bot loop. Some embodiments generate a "LoopStart" at the beginning of a Loop and some embodiments generate a "LoopEnd" after the Loop is finished. In some embodiments, the "LoopEnd" does not have the "count" key-value. Some embodiments generate a "event_type": "RecordStart" indicating the beginning of the record processing. Some embodiments generate a "RecordStart" with a key-value pair, "RecordNumber": "<RcrdNmbr>". Some embodiments generate a "RecordStart" with a corresponding "RecordEnd" after the processing for the record is finished.

Some embodiments detect bot failures by analyzing the one or more logs described above. For example, by determining that the one or more logs indicate a LoopStart without a corresponding "LoopEnd", or by determining that the one or more logs indicate a "RecordStart" without a corresponding "RecordEnd", some embodiments detect a bot failure.

In some embodiments, each new bot that is integrated or launched (e.g., for automating a new business process) is instrumented using the logging schemes described above. Bots that are integrated into a production environment (e.g., where other bots are already automating some business processes) are released after testing the bots in a test environment (e.g., a sandbox). Some embodiments use a canary release process when releasing new bots in stages. In some embodiments, some bots are updated (i.e., a newer version of the bots are installed) while other bots are not updated. Some embodiments use a bot version identifier (e.g., a year or release information for the bots) to indicate the version of the bots so as to distinguish the bots in the bot-level performance data.

Figure 2B:
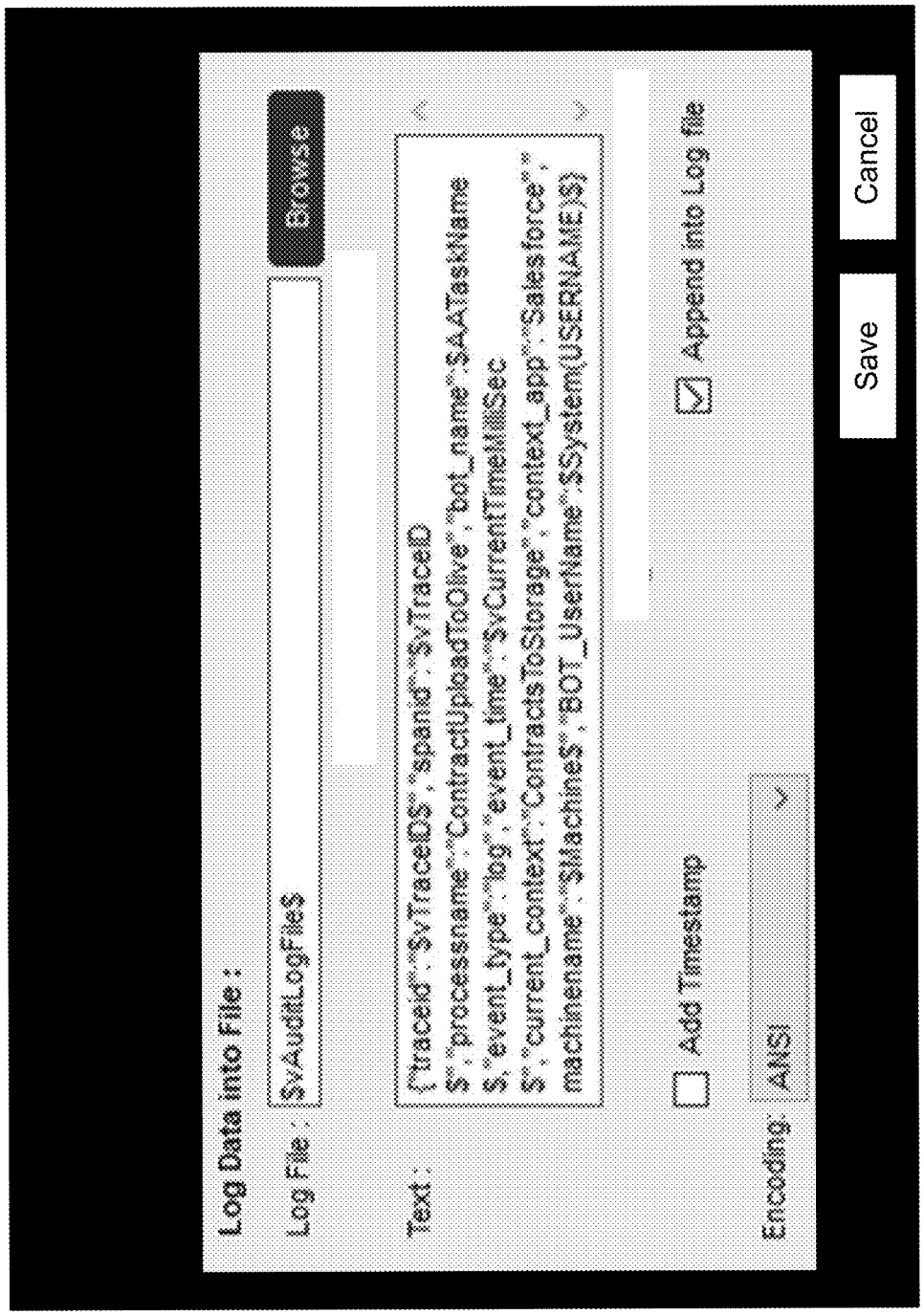
FIG. 2B illustrates a sample logger in a software client for instrumenting a bot or bot infrastructure, according to some embodiments.

In some embodiments, bots are instrumented at the time of development. For example, developer teams working on bot software or business teams in a federated model instrument bots while automating business processes. In some embodiments, bots are instrumented at the time of integration into a production environment. In some embodiments, the logs are reviewed and adjusted periodically (during the lifecycle of the bots) to meet emerging needs of a business. FIG. 2B illustrates a sample logger in a software client used to instrument the bots or bot environment, according to some embodiments.

Figure 3:
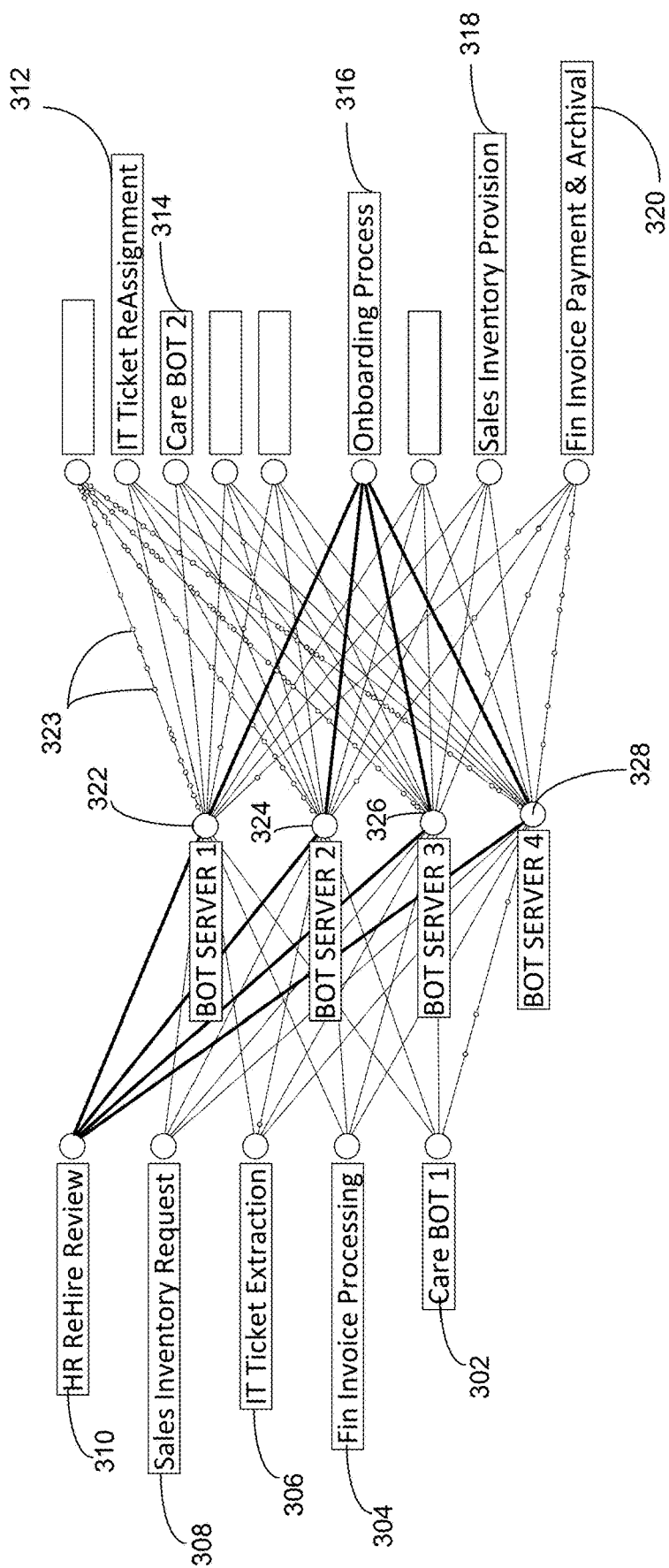
FIG. 3 illustrates an example user interface for displaying status of bot operations in accordance with some embodiments.

FIG. 3 illustrates an example user interface for displaying status of bot operations in accordance with some embodiments. In other words, the example illustrates flow of business operations performed by the bots. In particular, the example shows a visualization of data traffic between bots 302, 304, . . . , 320. In some embodiments, the bot servers 322, 324, 326, and 328 coordinate the communication between the bots 302, 304, . . . , 320. Each of the bots shown in FIG. 3 automate a respective business process. In some embodiments, a group of bots collectively automate a business process. For example, the bot 306 automating IT Ticket Extraction triggers (or is followed by) an action in the bot 312 automating IT Ticket Re-assignment, thereby collectively automating IT Ticket processing. As another example, the bot 304 (automating Fin Invoice processing) and the bot 320 (Fin Invoice Payment & Archive) collectively automate financial invoice processing. The dots 323 on the edges to and from the servers 322, 324, 326, and 328 indicate messages or data communicated to the servers from the respective bots. In some embodiments, the visualization shows live transmission and processing of data (sometimes called messages or packets) by the bots. In some embodiments, the bots are organized in a hierarchy in the visualization. In some embodiments, the bots are color-coded to indicate a state of the bots. In some embodiments, the resources associated with the bots and/or bot infrastructure (where the bots are executed) are also shown in the visualization alongside the bots. In some embodiments, the visualization includes dependency tree (capturing dependencies amongst the bots and/or the business processes). In some embodiments, the visualization enables users to drill down business processes.

Figure 4A:
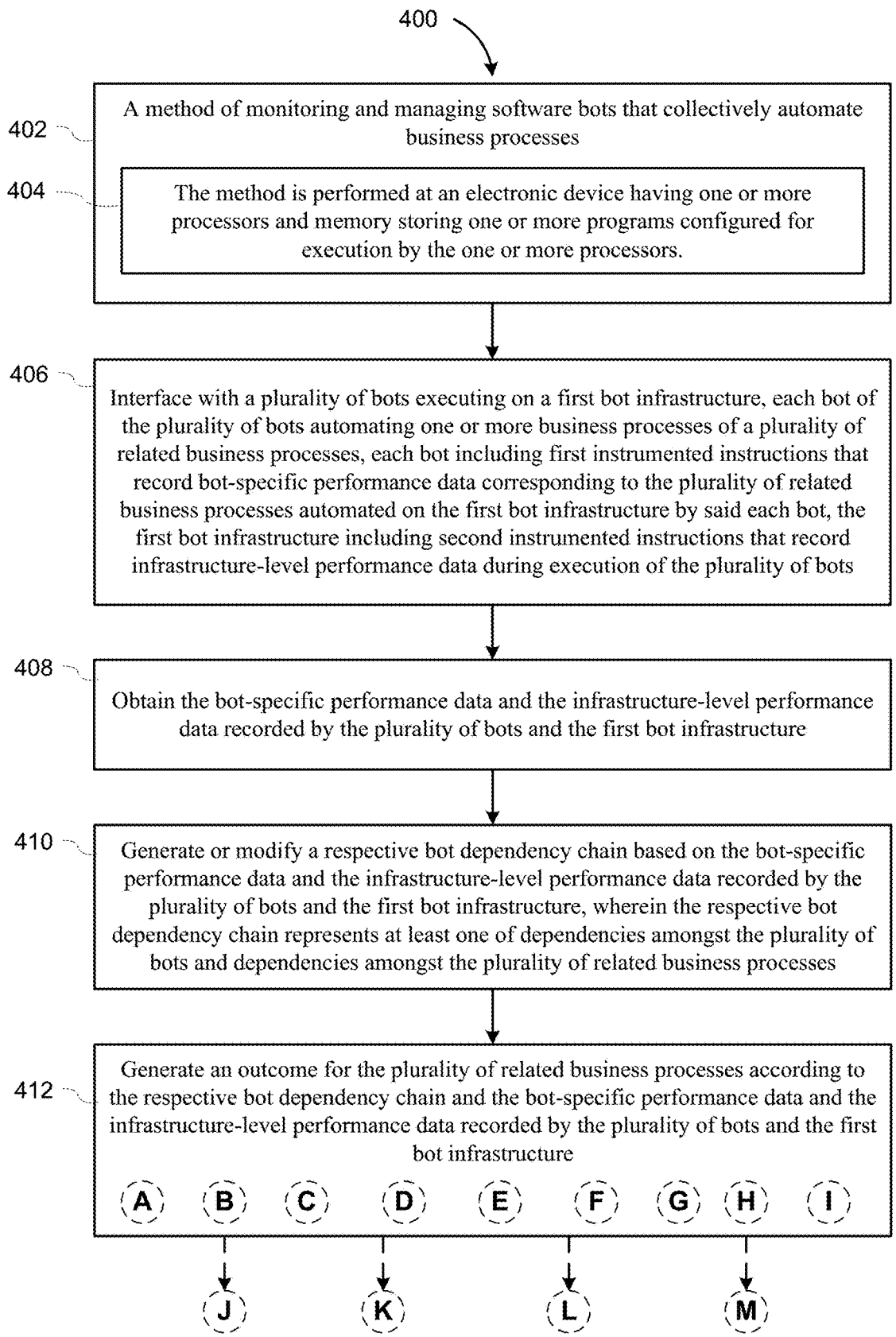
FIGS. 4A-4N are a flowchart of a method for operation and management of software bots that collectively automate business processes, in accordance with some embodiments.
Figure 4B:
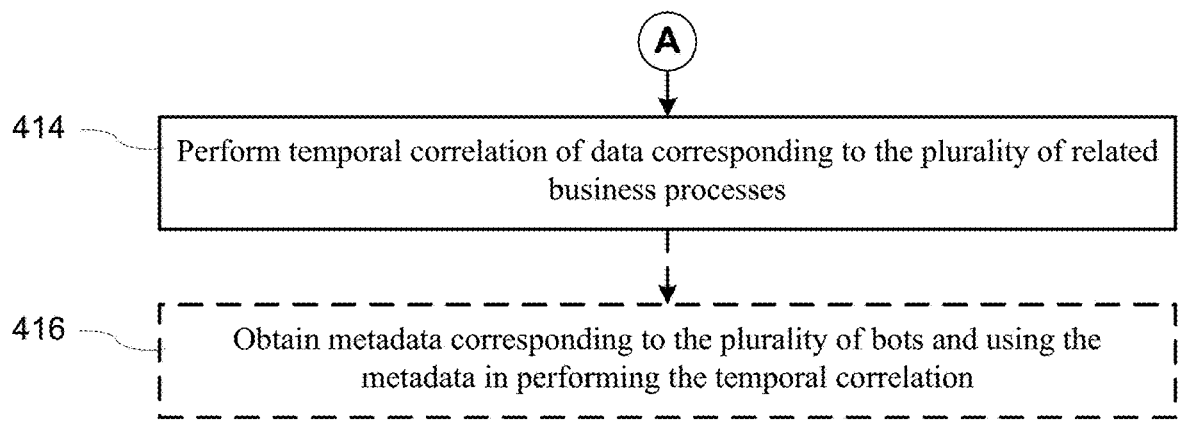
Figure 4C:
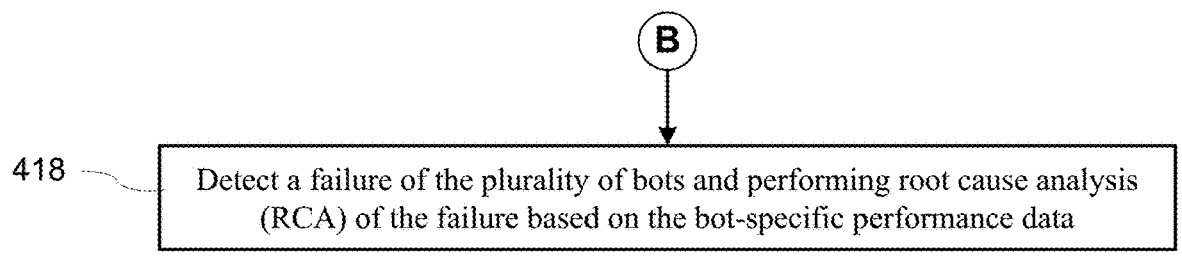
Figure 4D:
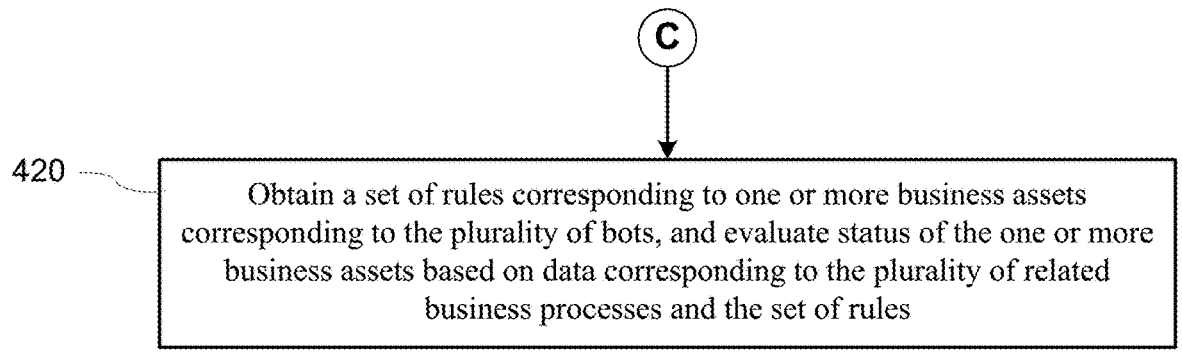
Figure 4K:
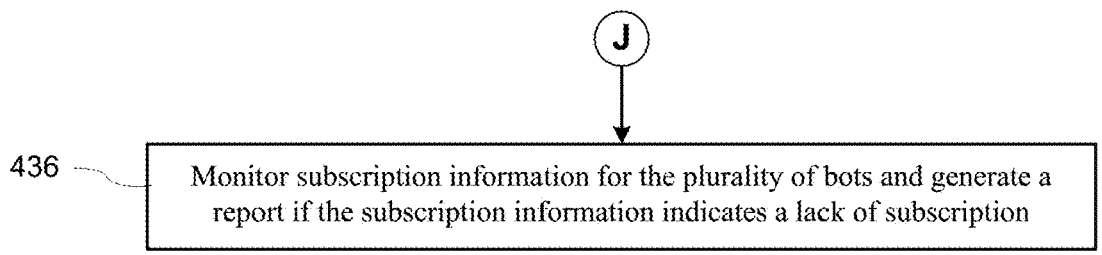
Figure 4L:
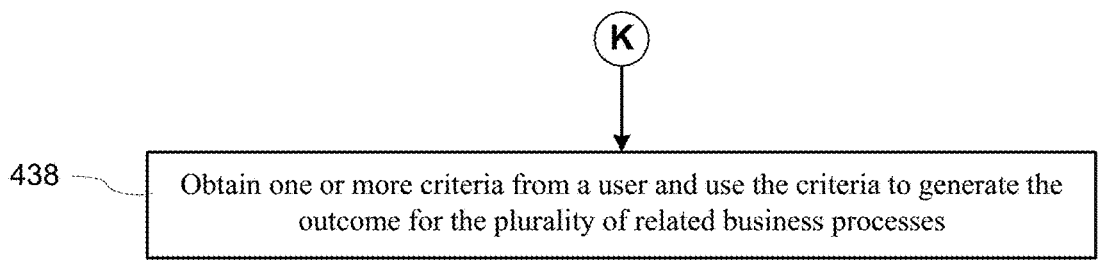
Figure 4M:
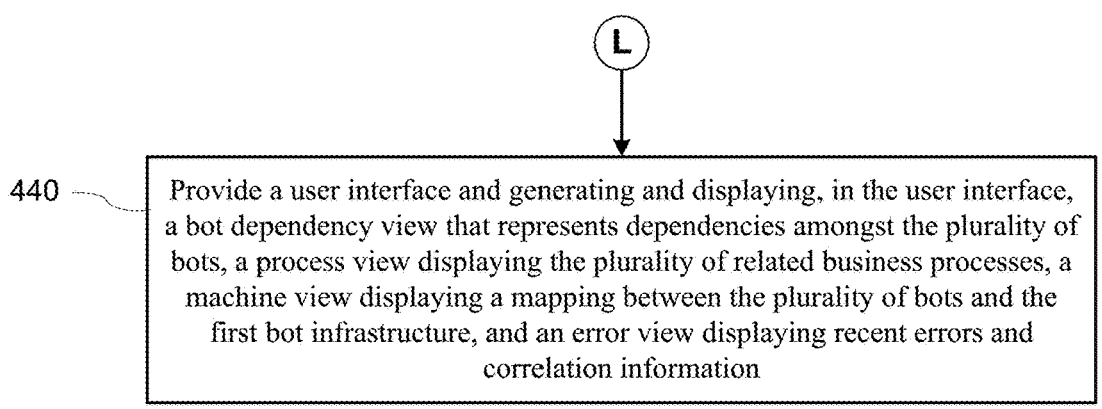
Figure 4N:
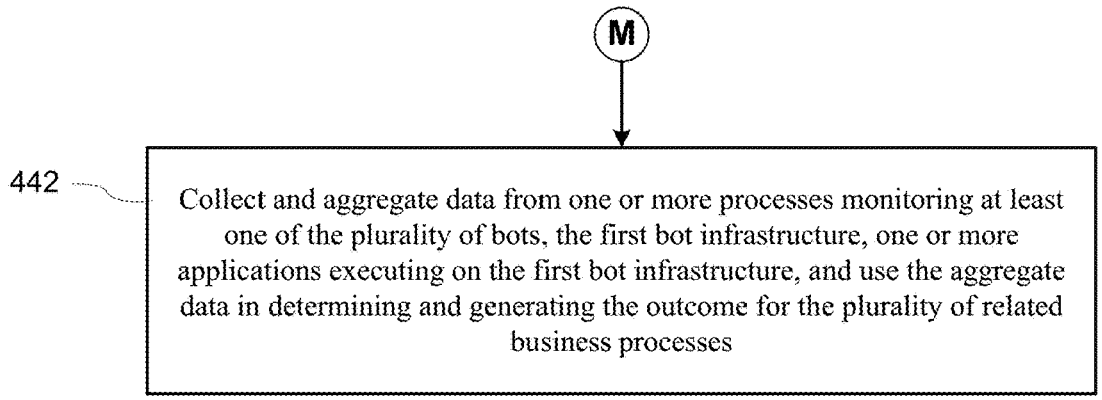

FIGS. 4A-4N are a flowchart of a method 400 for operation and management of software bots that collectively automate business processes (402), in accordance with some embodiments. The method 400 is performed (404) at an electronic device (e.g., a server running the one or more software bots) having one or more processors and memory storing one or more programs configured for execution by the one or more processors. The method 400 includes interfacing (406) with a plurality of bots (e.g., the bots 204-2, 204-4, 204-6, 204-8, 204-10, 204-12) executing on a first bot infrastructure (e.g., the bot infrastructure 206). Each bot of the plurality of bots automates one or more business processes of a plurality of related business processes. For example, the business processes include, but not limited to, performing certain user interface interactions, filling out forms, reviewing expense reports, answering user questions. More examples of business processes are illustrated and described above in reference to FIG. 3. Each bot includes first instrumented instructions that record bot-specific performance data corresponding to the plurality of related business processes automated on the first bot infrastructure by said each bot. Examples of logging formats and instrumentation are described above in reference to FIG. 2A. The first bot infrastructure includes second instrumented instructions that record infrastructure-level performance data (e.g., hardware performance data on memory, hard-disk, etc.) during execution of the plurality of bots. The step 406 includes establishing direct and/or indirect communication with the bots, bot infrastructure, and associated databases, to receive bot performance data.

The method 400 further includes obtaining (408) the bot-specific performance data and the infrastructure-level performance data recorded (e.g., asynchronously recorded or recorded in real-time) by the plurality of bots and the first bot infrastructure. In some embodiments, obtaining (408) the bot-specific performance data and the infrastructure-level performance data includes ingesting the logs into a database (e.g., the database 224) and retrieving the logs from the database, receiving the data in real time, and/or receiving the data in batches. In some embodiments, the data is injected directly from the bots and/or the infrastructure.

The method 400 also includes generating or modifying (410) a respective bot dependency chain based on the bot-specific performance data and the infrastructure-level performance data recorded by the plurality of bots and the first bot infrastructure. In some embodiments, the respective bot dependency chain is built using static information about one or more business assets. The respective bot dependency chain represents at least one of dependencies amongst the plurality of bots and dependencies amongst the plurality of related business processes. In some embodiments, the respective bot dependency chain also represents dependencies amongst the one or more business assets associated with the plurality of bots. The method 400 further includes generating (412) an outcome for the plurality of related business processes according to the respective bot dependency chain and the bot-specific performance data and the infrastructure-level performance data recorded by the plurality of bots and the first bot infrastructure.

Referring next to FIG. 4B, in some embodiments, generating the outcome for the plurality of related business processes includes performing (414) temporal correlation of data corresponding to the plurality of related business processes. In some embodiments, performing the temporal correlation includes performing patterns-based correlation on temporal data and/or time-series analysis using time slices of data. In some embodiments, the method 400 further includes obtaining (416) metadata corresponding to the plurality of bots and using the metadata in performing the temporal correlation. For example, performing the temporal correlation using the metadata includes mapping names of bots and correlating frequency of data with time-series information, etc. In some embodiments, obtaining (416) the metadata further includes ingesting (and retrieving) the metadata into a database. In some embodiments, the method 400 further includes plotting (e.g., using a graphical plotting tool) the correlation.

Referring next to FIG. 4C, in some embodiments, generating the outcome for the plurality of related business processes includes detecting (418) a failure of the plurality of bots and performing root cause analysis (RCA) of the failure based on the bot-specific performance data. In some embodiments, the method 400 includes performing RCA using an artificial intelligence algorithm and/or intelligent anomaly detection algorithm.

Referring next to FIG. 4D, in some embodiments, generating the outcome for the plurality of related business processes includes obtaining (420) a set of rules corresponding to one or more business assets corresponding to the plurality of bots, and evaluating status of the one or more business assets based on data corresponding to the plurality of related business processes and the set of rules.

In some embodiments, rule-based asset and cross-asset evaluation use temporal data and apply the set of rules obtained to analyze potential fault, spot issues, and/or eliminate issues. An example for rule-based asset analysis is provided below for illustration. Suppose the bot-level performance data shows the following:

{"traceid":"2019625211001ps549462","spanid":"004","processname":"ContractUploadToOlive", "bot_name":"MasterReports.atmx","event_type":"ErrorData","event_time":"06/25/2019 02:12:22","current_context":"IgnoringUnRelatedAttchmnts","context_app":"Salesforce", "machinename":"XD-10ISLA-21024","BOTASA":"ps549462","data": "ErrorLine: 1 , ErrorDesc: UnableToLogin to SalesForce"}

Temporal correlation of this log shows that on June 25th (6/25) at 2:12, a bot had an error because of an issue in a Salesforce process (e.g., an example of a first business process). Suppose, metrics or infrastructure-level performance data from the Salesforce server shows the following output:

6/25/2019 02:10:00 SF Server CPU 99%

Now, further assume that rules for the CPU says that for any CPU over 80% connections may error out. By correlating based on the rules, for this example, the system deduces that the bot failure is due to the SalesForce failure (e.g., an example of a first failure in the first business process).

As further illustration, consider the following example for cross-asset based evaluation. Suppose the bot-level performance data shows the following output:

```
{"traceid":"2019625211001ps549462","spanid":"2019625211001ps549462","processname":
"ContractUploadToOlive","bot_name":"CUTO_Main.atmx","event_type":"InfoData",
"event_time":"06/25/201902:11:40","current_context":"MainBot","context_app":
"MainProcess","machinename":"XD-10ISLA-21024","BOTASA":
ps549462,"data":"BeginMainProcessing"}
{"traceid":"2019625211001ps549462","spanid":"2019625211001ps549462","processname":
"ContractUploadToOlive","bot_name":"CUTO_Main.atmx","event_type":"InfoData",
"event_time":"06/25/201902:12:40","current_context":"MainBot","context_app":
"SubProcess1","machinename":"XD-10ISLA-21024","BOTASA":
ps549462,"data":"SubProc1Processing"}
{traceid":"2019625211001ps549462","spanid":"2019625211001ps549463","processname":
"ContractUploadToOlive","bot_name":"CUTO_Main.atmx","event_type":"InfoData",
"event_time":"06/25/201902:13:40","current_context":"MainBot","context_app":
"SubProcess2","machinename":"XD-10ISLA-21024","BOTASA":
ps549462,"data":"SubProc2Processing"}
{"traceid":"2019625211001ps549462","spanid":"2019625211001ps549463","processname":
"ContractUploadToOlive","bot_name":"CUTO_Main.atmx","event_type":"ErrorData",
"event_time":"06/25/201902:15:40","current_context":"MainBot","context_app":
"SubProcess2","machinename":"XD-10ISLA-21024","BOTASA":ps549462,","data":
"ErrorLine: 1 , ErrorDesc: SubProcess2 failed due to missing input files"}
```

For this example, temporal correlation and trace-span correlation show that there is a bot tree (sometimes called a bot dependency chain or a bot tree) illustrated below:

Main bot started
Sub process 1 started
Sub process 2 started
Sub Process 2 errored
Sub process 2 errored due to missing input files Cross-asset evaluation for this example shows the dependencies between the bots. In some embodiments, the method 400 includes troubleshooting or root-causing the specific failure.

Referring next to FIG. 4E, in some embodiments, generating the outcome for the plurality of related business processes includes detecting (422) an outage of the plurality of bots based on the bot-specific performance data, the respective bot dependency chain, a rules-based asset and cross asset status evaluation of data corresponding to the plurality of related business processes, and/or patterns-based temporal correlation of data corresponding to the plurality of related business processes. For example, the outage includes process hangs, an indication that an application that a bot was operating within is non-existent, or a newly deployed application or a UI caused a bot failure, and so on. In some embodiments, even after a bot outage is detected, a business process is not broken, because someone can still manually perform the process. In some embodiments, one or more bots other than the bot that has failed takes over the business process automated by the failed bot. In some embodiments, the method 400 includes, after detecting the outage, causing the one or more other bots (that have not failed) to take over the function of the failed bot(s).

In some embodiments, generating the outcome for the plurality of related business processes includes simulating (424) execution of the plurality of bots on the first bot infrastructure by playing back operations of the plurality of bots based on the bot-specific performance data and the infrastructure-level performance data the simulation indicating a cause of the outage of the plurality of bots.

Referring next to FIG. 4F, in some embodiments, generating the outcome for the plurality of related business processes includes applying (426) one or more statistical threshold analyses, using one or more predetermined thresholds, on the bot-specific performance data and the infrastructure-level performance data to determine a positive or a negative outcome for the plurality of related business processes. For example, the system correlates CPU memory usage with 95% disk I/O and does not report a failure or outage.

Referring next to FIG. 4G, in some embodiments, generating the outcome for the plurality of related business processes comprises generating and providing (428) a dashboard that indicates status of the plurality of bots and one or more business assets corresponding to the plurality of bots.

Referring next to FIG. 4H, in some embodiments, generating the outcome for the plurality of related business processes includes evaluating (430) the bot-specific performance data to determine return on investment (ROI) due to the plurality of related business processes. For example, suppose there is a bot that automates procurement or analysis of procurement reports, and business processes that generate business metrics (e.g., a procurement report). The method 400, in this example, includes evaluates and reviewing the information to determine a total volume of the procurement using the relevant information, using a unique identifier for tracking or reporting purposes, according to some embodiments.

Referring next to FIG. 4I, in some embodiments, generating the outcome for the plurality of related business processes includes generating and displaying (432) a dependency tree that encapsulates dependencies amongst the plurality of related business processes. Some embodiments include one or more options to drill down the dependency tree to zero in on specific bots, and/or corresponding business processes. In some embodiments, each node in the dependency tree corresponds to a business process and the edges show dependencies. In some embodiments, the dependency tree can be drilled down to show the assets and/or the bots corresponding to the business process. In some embodiments, the method 400 includes displaying operational functional status (of the bots and/or business processes) and/or root-cause priority indicators. In some embodiments, the nodes in the tree are color coded to indicate operational status of the processes and/or the bots (e.g., red indicates failure, grey indicates not operating, and green indicates that bots are functioning properly). Some embodiments use infrastructure-level performance data and/or bot-level performance data to detect functional outages. In some embodiments, a bot failure indicates that an error has occurred during execution of the bot. In some embodiments, a bot not operating indicates that a bot has intentionally paused or stopped for a (user-directed) maintenance or downtime.

Referring next to FIG. 4J, in some embodiments, generating the outcome for the plurality of related business processes includes generating and reporting (434) long term trends (e.g., over a period of hours, days) calculated using one or more analytics frameworks based on the bot-specific performance data and the infrastructure-level performance data. Some embodiments generate and/or report mean time to resolution, and/or other metrics used for scalability (e.g., whether more bots have to be added to the bot farm or whether one or more computing resources have to be added). In some embodiments, since performance data is collected and maintained, decisions regarding scalability is determined by examining CPU or memory level information. Some embodiments determine resource requirements according to load-related information in the infrastructure-level performance data. In some embodiments, long-term analytics is used to evaluate if the bot dependency chain can be extended (for scalability purposes).

Referring next to FIG. 4K, in some embodiments, the method 400 further includes monitoring (436) subscription information for the plurality of bots and generating a report according to the subscription information. For example, a user (e.g., a business owner) could subscribe to one or more bots (e.g., through an online portal), and, based on the subscription, the user is notified of information related to the one or more bots.

Referring next to FIG. 4L, in some embodiments, the method 400 further includes obtaining (438) one or more criteria from a user and using the criteria to generate the outcome for the plurality of related business processes. For example, financial personnel in a company provide information on total sales or revenue for bots automating finance-related business operations. As another example, human resources (HR) personnel provide information on how many applicants are approved for rehire, which is used to generate outcome for HR-related processes.

Referring next to FIG. 4M, in some embodiments, the method 400 further includes providing (440) a user interface (UI) and generating and displaying, in the user interface, a bot dependency view that represents dependencies amongst the plurality of bots, a process view (e.g., the process view 228) displaying the plurality of related business processes, a machine view (e.g., the machine view 230) displaying a mapping between the plurality of bots and the first bot infrastructure, and/or an error view (e.g., the error view 232) displaying recent errors and correlation information. In some embodiments, the UI includes a subset or a subset of the aforementioned views.

Referring next to FIG. 4N, in some embodiments, the method 400 further includes collecting and aggregating (442) data from one or more processes monitoring at least one of the plurality of bots, the first bot infrastructure, one or more applications executing on the first bot infrastructure, and using the aggregate data in determining and generating the outcome for the plurality of related business processes.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method of monitoring and managing software bots that collectively automate business processes, the method comprising:
    obtaining bot-specific performance data and infrastructure-level performance data recorded by a plurality of software bots executing on a first bot infrastructure;
    generating or modifying a respective bot dependency chain based on the bot-specific performance data and the infrastructure-level performance data recorded by the plurality of software bots and the first bot infrastructure, wherein the respective bot dependency chain represents at least one of dependencies amongst the plurality of software bots automating different business processes of a plurality of related business processes and dependencies amongst different business processes of the plurality of related business processes;
    generating an outcome for the plurality of related business processes according to the respective bot dependency chain and the bot-specific performance data and the infrastructure-level performance data recorded by the plurality of software bots and the first bot infrastructure;
    monitoring an online portal for subscription to the plurality of software bots; and
    in response to a user subscribing, via the online portal, to a software bot of the plurality of software bots, and in accordance with the outcome, displaying information on the software bot, including a machine of the first bot infrastructure where the software bot is executing, data and time information, dependent tasks, and/or iteration count of the software bot.

2. The method of claim 1, wherein the respective bot dependency chain represents a hierarchical dependency among software bots automating different business processes of the plurality of related business processes and wherein generating the outcome for the plurality of related business processes comprises performing temporal correlation of data corresponding to different business processes of the plurality of related business processes.

3. The method of claim 2, further comprising obtaining metadata corresponding to respective software bots automating different business processes of the plurality of business processes and using the metadata in performing the temporal correlation.

4. The method of claim 1, wherein generating the outcome for the plurality of related business processes comprises detecting an outage of the plurality of software bots based on the bot-specific performance data, the respective bot dependency chain, a rules-based asset and cross asset status evaluation of data corresponding to the plurality of related business processes, and patterns-based temporal correlation of data corresponding to the plurality of related business processes.

5. The method of claim 1, wherein generating the outcome for the plurality of related business processes comprises generating and providing a dashboard that indicates status of the plurality of software bots and one or more business assets corresponding to the plurality of software bots.

6. The method of claim 1, wherein generating the outcome for the plurality of related business processes comprises evaluating the bot-specific performance data to determine return on investment (ROI) due to the plurality of related business processes.

7. The method of claim 1, further comprising providing a user interface and generating and displaying, in the user interface, a bot dependency view that represents dependencies amongst the plurality of software bots, a process view displaying the plurality of related business processes, a machine view displaying a mapping between the plurality of software bots and the first bot infrastructure, and an error view displaying recent errors and correlation information.

8. An electronic device, comprising:
one or more processors; and
memory storing one or more programs for execution by the one or more processors, the one or more programs including instructions for:
obtaining bot-specific performance data and infrastructure-level performance data recorded by a plurality of software bots executing on a first bot infrastructure;
generating or modifying a respective bot dependency chain based on the bot-specific performance data and the infrastructure-level performance data recorded by the plurality of software bots and the first bot infrastructure, wherein the respective bot dependency chain represents at least one of dependencies amongst the plurality of software bots automating different business processes of a plurality of related business processes and dependencies amongst different business processes of the plurality of related business processes;
generating an outcome for the plurality of related business processes according to the respective bot dependency chain and the bot-specific performance data and the infrastructure-level performance data recorded by the plurality of software bots and the first bot infrastructure;
monitoring an online portal for subscription to the plurality of software bots; and
in response to a user subscribing, via the online portal, to a software bot of the plurality of software bots, and in accordance with the outcome, displaying information on the software bot, including a machine of the first bot infrastructure where the software bot is executing, data and time information, dependent tasks, and/or iteration count of the software bot.

9. The electronic device of claim 8, wherein the respective bot dependency chain represents a hierarchical dependency among software bots automating different business processes of the plurality of related business processes and wherein generating the outcome for the plurality of related business processes comprises performing temporal correlation of data corresponding to different business processes of the plurality of related business processes.

10. The electronic device of claim 9, wherein the one or more programs include instructions for obtaining metadata corresponding to respective software bots automating different business processes of the plurality of business processes and using the metadata in performing the temporal correlation.

11. The electronic device of claim 8, wherein generating the outcome for the plurality of related business processes comprises detecting an outage of the plurality of software bots based on the bot-specific performance data, the respective bot dependency chain, a rules-based asset and cross asset status evaluation of data corresponding to the plurality of related business processes, and patterns-based temporal correlation of data corresponding to the plurality of related business processes.

12. The electronic device of claim 8, wherein generating the outcome for the plurality of related business processes comprises generating and providing a dashboard that indicates status of the plurality of software bots and one or more business assets corresponding to the plurality of software bots.

13. The electronic device of claim 8, wherein generating the outcome for the plurality of related business processes comprises evaluating the bot-specific performance data to determine return on investment (ROI) due to the plurality of related business processes.

14. The electronic device of claim 8, wherein the one or more programs include instructions for providing a user interface and generating and displaying, in the user interface, a bot dependency view that represents dependencies amongst the plurality of software bots, a process view displaying the plurality of related business processes, a machine view displaying a mapping between the plurality of software bots and the first bot infrastructure, and an error view displaying recent errors and correlation information.

15. A non-transitory computer-readable storage medium storing one or more programs for execution by one or more processors of an electronic device, the one or more programs including instructions for:
obtaining bot-specific performance data and infrastructure-level performance data recorded by a plurality of software bots executing on a first bot infrastructure;
generating or modifying a respective bot dependency chain based on the bot-specific performance data and the infrastructure-level performance data recorded by the plurality of software bots and the first bot infrastructure, wherein the respective bot dependency chain represents at least one of dependencies amongst the plurality of software bots automating different business processes of a plurality of related business processes and dependencies amongst different business processes of the plurality of related business processes;

generating an outcome for the plurality of related business processes according to the respective bot dependency chain and the bot-specific performance data and the infrastructure-level performance data recorded by the plurality of software bots and the first bot infrastructure;

monitoring an online portal for subscription to the plurality of software bots; and in response to a user subscribing, via the online portal, to a software bot of the plurality of software bots, and in accordance with the outcome, displaying information on the software bot, including a machine of the first bot infrastructure where the software bot is executing, data and time information, dependent tasks, and/or iteration count of the software bot.

16. The non-transitory computer-readable storage medium of claim 15, wherein the respective bot dependency chain represents a hierarchical dependency among software bots automating different business processes of the plurality of related business processes and wherein generating the outcome for the plurality of related business processes comprises performing temporal correlation of data corresponding to different business processes of the plurality of related business processes.

17. The non-transitory computer-readable storage medium of claim 16, wherein the one or more programs include instructions for obtaining metadata corresponding to respective software bots automating different business processes of the plurality of business processes and using the metadata in performing the temporal correlation.

18. The non-transitory computer-readable storage medium of claim 15, wherein generating the outcome for the plurality of related business processes comprises detecting an outage of the plurality of software bots based on the bot-specific performance data, the respective bot dependency chain, a rules-based asset and cross asset status evaluation of data corresponding to the plurality of related business processes, and patterns-based temporal correlation of data corresponding to the plurality of related business processes.

19. The non-transitory computer-readable storage medium of claim 15, wherein generating the outcome for the plurality of related business processes comprises generating and providing a dashboard that indicates status of the plurality of software bots and one or more business assets corresponding to the plurality of software bots.

20. The non-transitory computer-readable storage medium of claim 15, wherein generating the outcome for the plurality of related business processes comprises evaluating the bot-specific performance data to determine return on investment (ROI) due to the plurality of related business processes.

21. The non-transitory computer-readable storage medium of claim 15, wherein the one or more programs include instructions for providing a user interface and generating and displaying, in the user interface, a bot dependency view that represents dependencies amongst the plurality of software bots, a process view displaying the plurality of related business processes, a machine view displaying a mapping between the plurality of software bots and the first bot infrastructure, and an error view displaying recent errors and correlation information.

* * * * *